(12) United States Patent
Ueda et al.

(10) Patent No.: US 7,309,229 B2
(45) Date of Patent: Dec. 18, 2007

(54) MOLD DIE

(75) Inventors: Masanori Ueda, Kawasaki (JP); Haruyuki Matsunaga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 278 days.

(21) Appl. No.: 11/058,205

(22) Filed: Feb. 16, 2005

(65) Prior Publication Data

US 2006/0115552 A1    Jun. 1, 2006

(30) Foreign Application Priority Data

Nov. 26, 2004  (JP) ............................. 2004-342453

(51) Int. Cl.
 B29C 45/44    (2006.01)
(52) U.S. Cl. ................. 425/577; 425/DIG. 58
(58) Field of Classification Search ............... 425/577, 425/DIG. 58
 See application file for complete search history.

(56) References Cited

U.S. PATENT DOCUMENTS 4,919,608 A * 4/1990 Catalanotti et al. .......... 425/577

FOREIGN PATENT DOCUMENTS

| JP | 63-203916 | 8/1988 |
|---|---|---|
| JP | 5-47534 | 6/1993 |
| JP | 5-76721 | 10/1993 |
| JP | 5-312213 | 11/1993 |
| JP | 7-110028 | 4/1995 |
| JP | 7-190048 | 7/1995 |
| JP | 9-57760 | 3/1997 |
| JP | 10-331841 | 12/1998 |
| JP | 11-311242 | 11/1999 |
| JP | 3056024 | 4/2000 |
| JP | 2000-240640 | 9/2000 |
| JP | 2001-65570 | 3/2001 |

* cited by examiner

Primary Examiner—Tim Heitbrink
(74) Attorney, Agent, or Firm—Kratz, Quintos & Hanson, LLP

(57) ABSTRACT

An injection-molding mold die includes a cylinder and a diameter-enlarging member. The cylinder includes a hollow, an opening, and an external peripheral surface, and has an undercut-forming section formed on the external peripheral surface thereof, which forms a shape incapable of being drafted from the mold die in the direction of opening the same. The diameter-enlarging member enters the hollow through the opening so as to enlarge the external diameter of the cylinder and can relatively advance to or retreat from the hollow. The diameter-enlarging member lies in the hollow when the mold die is clamped and exits the hollow when the mold die is opened. The cylinder is made from a metal having a longitudinal elastic modulus greater than the value of a predetermined pressure, and whose external diameter enlarged by the insertion of the diameter-enlarging member is reduced when the diameter-enlarging member exits the hollow.

3 Claims, 13 Drawing Sheets

MOLD DIE

BACKGROUND OF THE INVENTION

1. Field of the Invention

The present invention relates to an injection-molding mold die for injecting a molten material at a predetermined pressure into a cavity formed by clamping the mold die.

2. Description of the Related Art

Many items are molded by injection-molding with which a material melt into a cavity formed by clamping a mold die is injected at a predetermined pressure. With respect to this injection-molding, mold designed are performed so as to cope with items having a variety of shapes; hence, an item having even a shape like an undercut which cannot be drafted in the direction of opening the mold die is designed so as to be molded.

A dynamic-pressure bearing molded by injection-molding will be described by way of example.

FIG. 1 illustrates an example dynamic-pressure bearing 8, a part of which is cut out.

The dynamic-pressure bearing 8 shown in FIG. 1 has a cylindrical shape and includes dynamic-pressure grooves 81 having a herringbone shape (a shape in which grooves reversed in a dog-legged shape are arranged at a predetermined interval in the circumferential direction), formed in two above and below rows on its internal peripheral surface 80 coming into contact with a rotating shaft 9 indicated by a dotted-chain line in the figure. Since the dynamic-pressure grooves 81 hold lubricant, when the rotating shaft 9 rotates, the lubricant is drawn to the reversed portion of the dynamic-pressure grooves 81, thereby causing the reversed portion to have a high oil-film pressure generated thereat. The dynamic-pressure bearing 8 generates a load toward the center with this hydraulic pressure, thereby bringing about the rotating shaft 9 and the internal circumferential surface 80 in a non-contact state and rotatably supporting the rotating shaft 9.

In order to form the herringbone dynamic-pressure grooves 81 on the internal peripheral surface 80 during injection-molding, a core pin having undulations for forming dynamic-pressure grooves on the external peripheral surface thereof is used. Meanwhile, since a herringbone shape is formed of undercuts, when a dynamic-pressure bearing itself possibly has a cut formed therein so that the internal diameter thereof is likely to become larger due to its elastic deformation (for example, see Japanese Unexamined Utility Model Registration Application Publication No. 5-76721), the undercuts can be drafted from the core pin; unfortunately, with this idea, the cut breaks up the circumferential continuity of the dog-legged reversed grooves forming a herringbone shape, thereby resulting in failure of having a high oil film pressure generated in the grooves. In view of this, by devising the design of the mold die, a so-called divided-molding method is proposed in which a cylindrical dynamic-pressure bearing is made by independently injection-molding two semi-cylinders, each having a shape that a cylinder is divided into two parts along its center axis, and by bonding them to each other (for example, see Japanese Unexamined Utility Model Registration Application Publication No. 5-47534). Also, a so-called rotationally drafting method is proposed in which a core pin divided into two parts so that the reversed portion of the herringbone-shaped grooves serves as a parting line is used so as to form the dynamic-pressure groove portion of the dynamic-pressure bearing while rotating the core pin (for example, see Japanese Unexamined Patent Application Publication Nos. 2000-240640 and 7-110028). In addition, a so-called forcefully extracting method is proposed in which the dynamic-pressure groove portion of the dynamic-pressure bearing is drafted from the core pin by utilizing elastic deformation of the dynamic-pressure bearing as a molded item (for example, see Japanese Unexamined Patent Application Publication Nos. 7-190048, 10-331841, 11-311242, and 2001-65570, and Japanese Patent No. 3056024). Furthermore, a so-called diameter-variance method is proposed in which the dynamic-pressure groove portion of the dynamic-pressure bearing is drafted by utilizing a difference in coefficients of linear expansion of a core pin and a dynamic-pressure bearing as a molded item (for example, see Japanese Unexamined Patent Application Publication Nos. 63-203916 and 5-312213).

A dynamic-pressure bearing is incorporated in a small precision apparatus such as a hard-disk drive since non-repeatable run-out (NRRO) asynchronous with rotation of its rotating shaft is reduced and its silence property is also improved. The depth of each dynamic-pressure groove of the dynamic-pressure bearing incorporated in such a small precision machine is on the order of several micrometers to tens of micrometers.

Hence, with the foregoing divided-molding method disclosed in Japanese Unexamined Utility Model Registration Application Publication No. 5-47534, precise alignment of the bonding surfaces is difficult. Also, with the rotational drafting method disclosed in Japanese Unexamined Patent Application Publication Nos. 2000-240640 and 7-110028, since the reversed portion of the herringbone-shaped grooves serves as a parting line, when dynamic-pressure grooves having a depth on the order of several micrometers to tens of micrometers are intended to be precisely formed, die-matching is difficult. In addition, because of a shape restriction, a dynamic-pressure bearing cannot be made so as to form a shape that herringbones are provided in two rows as shown in FIG. 1, for example. Further, with the forcefully drafting method disclosed in Japanese Unexamined Patent Application Publication Nos. 7-190048, 10-331841, 11-311242, and 2001-65570, and Japanese Patent No. 3056024, since the grooves have a depth on the order of several micrometers to tens of micrometers, there is a risk that the grooves are deformed or crushed when the dynamic-pressure groove portion of the dynamic-pressure bearing is drafted from a core pin.

Also, when dynamic-pressure grooves having a depth on the order of several micrometers to tens of micrometers are intended to be precisely formed, materials available for the dynamic-pressure bearing are limited due to their properties; hence, it is needed to use polyphenylene sulfide (PPS), liquid crystal polymer (LCP), or the like, which is called super-engineering plastic. Referring to Table 1, an example dynamic-pressure bearing formed so that its internal diameter is designed at 3.5 mm and its internal diameter is expanded more than the external diameter of a core pin by heating the dynamic-pressure bearing up to 80° C. will be described.

TABLE 1

| Resin material | Unit | Factors | | |
| --- | --- | --- | --- | --- |
| | | LPC with reinforced sliding grade | PPS with reinforced sliding grade | POM with non-reinforced grade |
| Change in diameters | mm | 0.004 | 0.006 | 0.030 |
| Coefficient of linear expansion | 1/K | $1.2 \times 10^{-5}$ | $2.0 \times 10^{-5}$ | $1.1 \times 10^{-4}$ |

In the leftmost, and the center, columns of the factor column, Table 1 shows differences in the external diameter of the core pin and the internal diameters of dynamic-pressure bearings (changes in diameters) injection-molded with LPC, PPS included in super-engineering plastic as a molten material, respectively. In the rightmost column shows the same with polyacetal (POM) included in general-purpose engineering plastic. Also, Table 1 shows coefficients of linear expansions of the respective molten materials.

As shown in Table 1, when LCP or PPS is used as a molten material, the change in diameters is smaller than that when POM is used, whereby it is difficult to draft the dynamic-pressure groove portion of the dynamic-pressure bearing while expecting the change in diameters. Meanwhile, when POM having a greater coefficient of linear expansion than that of LCP or PPS is used as a molted material, a change in diameters can be expected to a certain extent. However, a material having a large coefficient of linear expansion generally does not allow an item to be accurately molded; hence, when a material having a large coefficient of linear expansion allowing a certain amount of change in diameters is used as a molten material, it is difficult to accurately form dynamic-pressure grooves on the order of several micrometers to tens of micrometers.

As described above, even when any one of the molding methods is used, a dynamic-pressure bearing is not accurately molded. In view of the above problems, another method is proposed in which undulations for forming dynamic-pressure grooves are provided on the external peripheral surface of a sleeve composed of a heat-resistant rubber; the external diameter of the sleeve is enlarged by inserting a rigid body having an external diameter greater than the internal diameter of the sleeve into the sleeve; and a dynamic-pressure bearing is injection-molded in a state in which the external diameter of the sleeve is enlarged (see Japanese Unexamined Patent Application Publication No. 9-57760). According to the method of using the sleeve composed of the heat-resistant rubber, when the rigid body is drafted from the sleeve on the occasion of opening the mole die, the external diameter of the sleeve becomes smaller due to elasticity of the sleeve, whereby the dynamic-pressure groove portion of the dynamic-pressure bearing is drafted. An example of heat-resistant rubber practically available for the sleeve is a heat-resistant fluoro rubber (FKM). The heat-resistant temperature of the sleeve in continuous use is about 200° C., and its high-temperature limit in use is on the order of 260° C. to 300° C. The heat-resistant FKM has a longitudinal elastic modulus on the order of 0.5 MPa to 8 MPa, which is far smaller than that of a metal material normally applied for a mold die, and is thus likely to be deformed.

In order to accurately form dynamic-pressure grooves on the order of several micrometers to tens of micrometers, when a super-engineering plastic is used as a molten material for example, its injection-molding temperature is likely to be rather high of about 200° C. to 300° C. Also, its injection-molding pressure is about 10 MPa to 80 MPa. Accordingly, the sleeve composed of the heat-resistant rubber disclosed in Japanese Unexamined Patent Application Publication No. 9-57760 is insufficient in thermal and strength aspects for accurately injection-molding a precision component.

SUMMARY OF THE INVENTION

The present invention has been made in view of the above circumstances and provides a mold die for accurately injection-molding a precision component having an undercut.

An injection-molding mold die according to the present invention, for injecting a molten material at a predetermined pressure into a cavity formed by clamping the mold die includes (i) a cylinder having (a) a hollow formed therein, (b) an opening formed at the end thereof, having the hollow extending thereto, (c) an external peripheral surface defining a part of the cavity, and (d) an undercut-forming section formed on the external peripheral surface thereof, which forms a shape incapable of being drafted from the mold die in the direction of opening the same; and (ii) a diameter-enlarging member which enters the hollow through the opening so as to enlarge the external diameter of the cylinder and which can relatively advance to or retreat from the hollow. The diameter-enlarging member lies in the hollow when the mold die is clamped and exits the hollow when the mold die is opened. The cylinder is composed of a metal having a longitudinal elastic modulus greater than the value of the predetermined pressure, and the external diameter enlarged by the diameter-enlarging member is reduced when the diameter-enlarging member exits the hollow.

In the mold die according to the present invention, the diameter of the cylinder is reduced due to its elasticity when the diameter-enlarging member is extracted from the hollow, whereby a molded item having the foregoing shape is drafted. As a result, with the mold die according to the present invention, an item having a shape including an undercut can be injection-molded. In addition, since the cylinder is composed of a metal having a longitudinal elastic modulus greater than the value of the predetermined pressure, even when the molten material is injected into the cavity at the predetermined pressure, the cylinder is sufficient in thermal and strength aspects. Consequently, with the mold die according to the present invention, a precision component having an undercut can be accurately injection-molded.

The cylinder may be composed of a stainless steel or a maraging steel. A steel has a longitudinal modulus tens of thousands times that of a heat-resistant FKM and is hardly deformed even at a high pressure of $1.0 \times 10^7$ Pa or higher.

As the molted material, a super-engineering plastic such as polyphenylene sulfide (PPS) or liquid crystal polymer (LCP) may be applied.

According to the present invention, a mold die for accurately injection-molding a precision component having an undercut can be provided.

DETAILED DESCRIPTION OF THE INVENTION

Embodiments of the present invention will be described with reference to the attached drawings.

In the first place, a dynamic-pressure bearing as an example of molded items formed by injection-molding with a mold die according to one embodiment of the present invention will be described.

Figure 1:
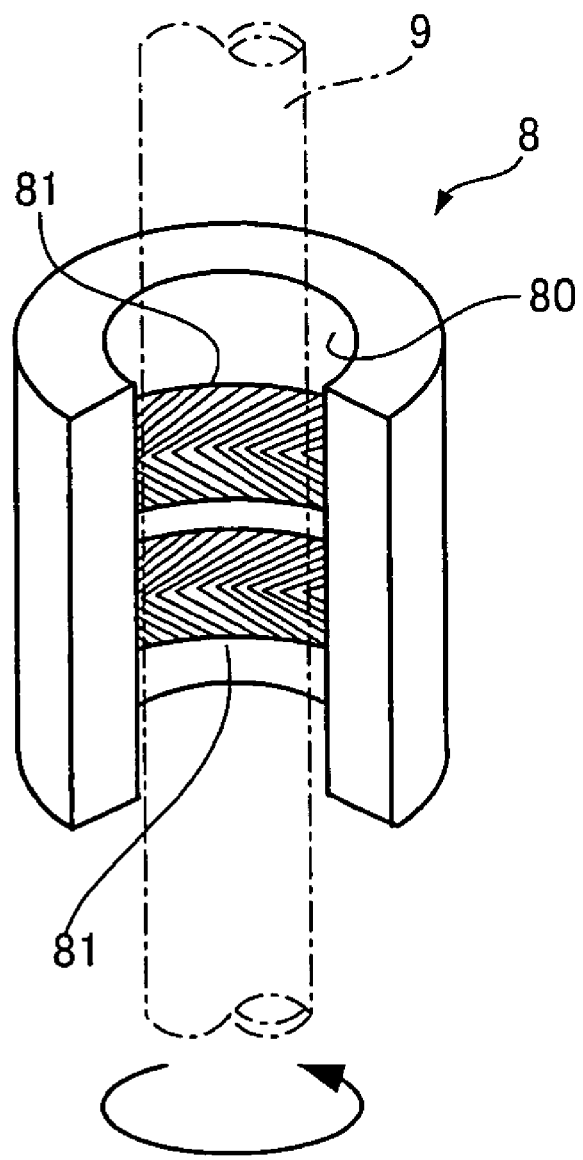
FIG. 1 illustrates an example dynamic-pressure bearing, a part of which is cut out.
Figure 2:
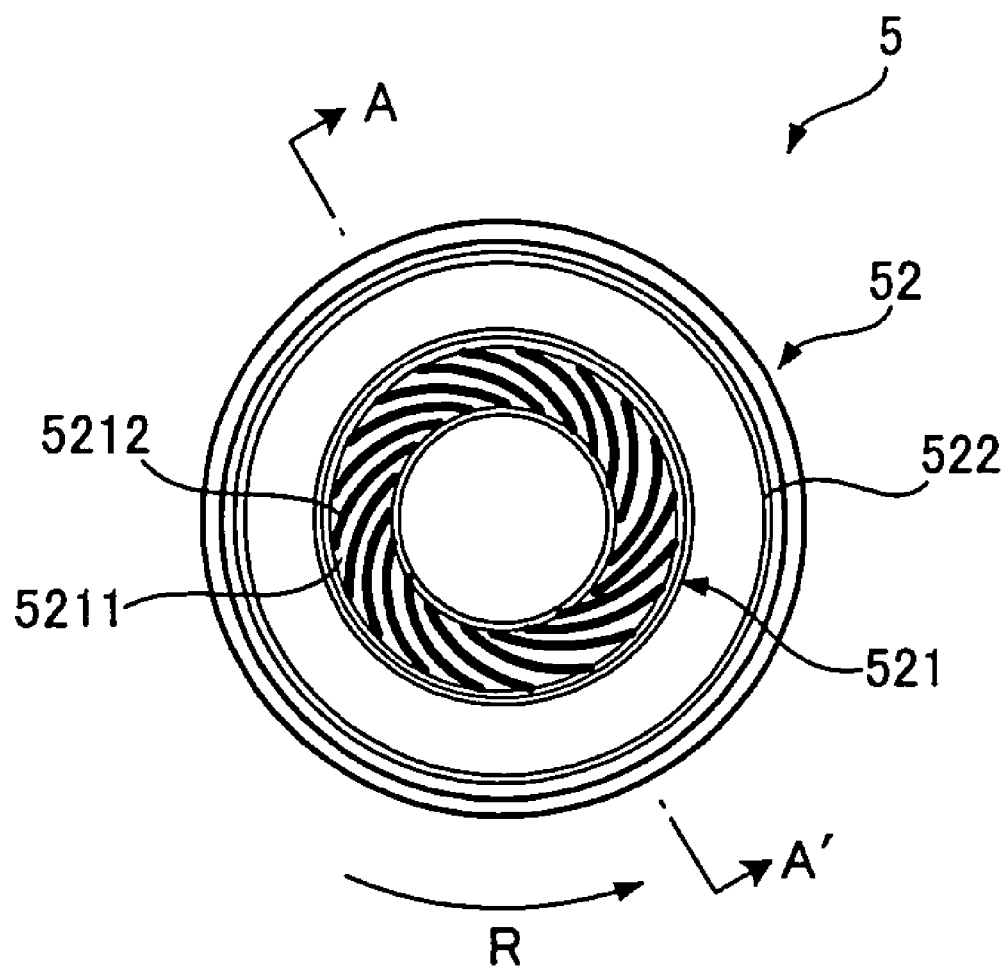
FIG. 2 is a front view of the example dynamic-pressure bearing.
Figure 3:
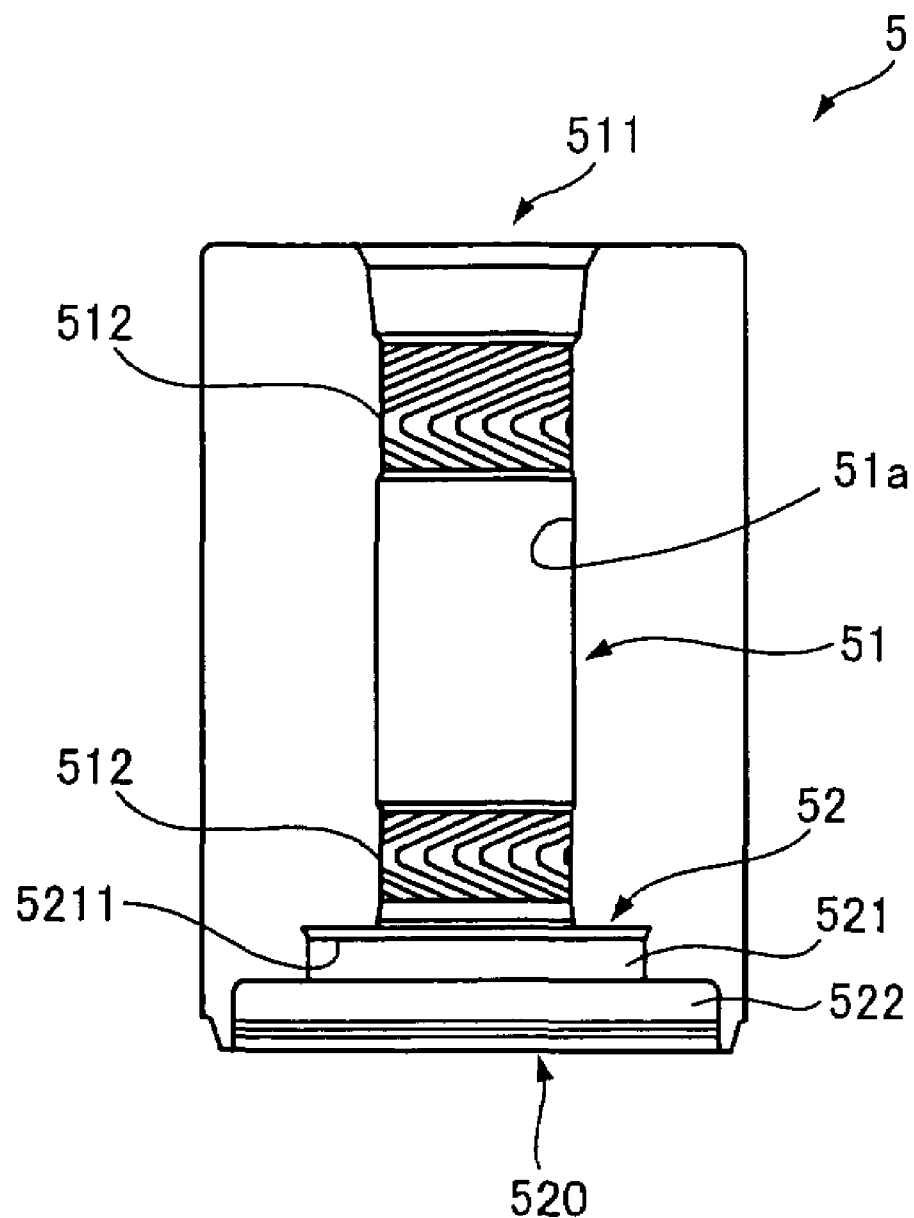
FIG. 3 is a sectional view of the dynamic-pressure bearing taken along the line A-A shown in FIG. 2.

FIG. 2 is a front view of an example dynamic-pressure bearing 5, and FIG. 3 is a sectional view of the same along the line A-A indicated in FIG. 2.

A dynamic-pressure bearing 5 shown in FIGS. 2 and 3 is incorporated in a hard disk drive (HDD) and serves as a bearing of a rotating shaft for rotationally driving a hard disk. The dynamic-pressure bearing 5 has a cylindrical shape, composed of polyphenylene sulfide (PPS), a kind of super-engineering plastics, and includes a radial-bearing section 51 and a thrust-bearing section 52. The dynamic-pressure bearing 5 may be composed of liquid crystal polymer (LCP) instead of PPS.

As shown in FIG. 3, the radial-bearing section 51 has a rotating-shaft receiving-hole 511 formed therein, into which the rotating shaft (not shown) is inserted, and an internal peripheral wall 51a defining the rotating-shaft receiving-hole 511, on which herringbone dynamic-pressure grooves 512, that is, dog-legged reversed grooves arranged at a predetermined interval in the circumferential direction are formed in two upper and lower rows. The depth of each herringbone dynamic-pressure grooves 512 is on the order of several micrometers to tens of micrometers. Also, the thrust-bearing section 52 has an opening 520 formed therein, extending to the rotating-shaft receiving hole 511. The rotating shaft (not shown) includes a flange at the end thereof. The opening 520 is made up of a flange-accommodating section 521 accommodating the flange therein and a bush-accommodating section 522 having a diameter greater than that of the flange-accommodating section 521. As shown in FIG. 2, regarding walls of the thrust-bearing section 52 defining the flange-accommodating section 521, a wall 5211 extending in the radial direction of the dynamic-pressure bearing 5 has trust dynamic-pressure grooves 5212 formed thereon, extending radially while declining in the rotating direction (the arrow R direction in the figure). The bush-accommodating section 522 has a trust bush (not shown) disposed therein, and the flange of the rotating shaft accommodated in the flange-accommodating section 521, is disposed between the trust bush and the wall 5211 having the trust dynamic-pressure grooves 5212 formed thereon.

When the dynamic-pressure bearing 5 shown in FIGS. 2 and 3 is to be formed by injection-molding, the herringbone dynamic-pressure grooves 512 serve as a portion of the bearing which cannot be drafted from the mold die in direction of opening the same. With the mold die according to the one embodiment of the present invention, a cylinder having a shape (including undercuts) which, as described above, cannot be extracted from the mold die in the direction of opening the same is molded.

Figure 4:
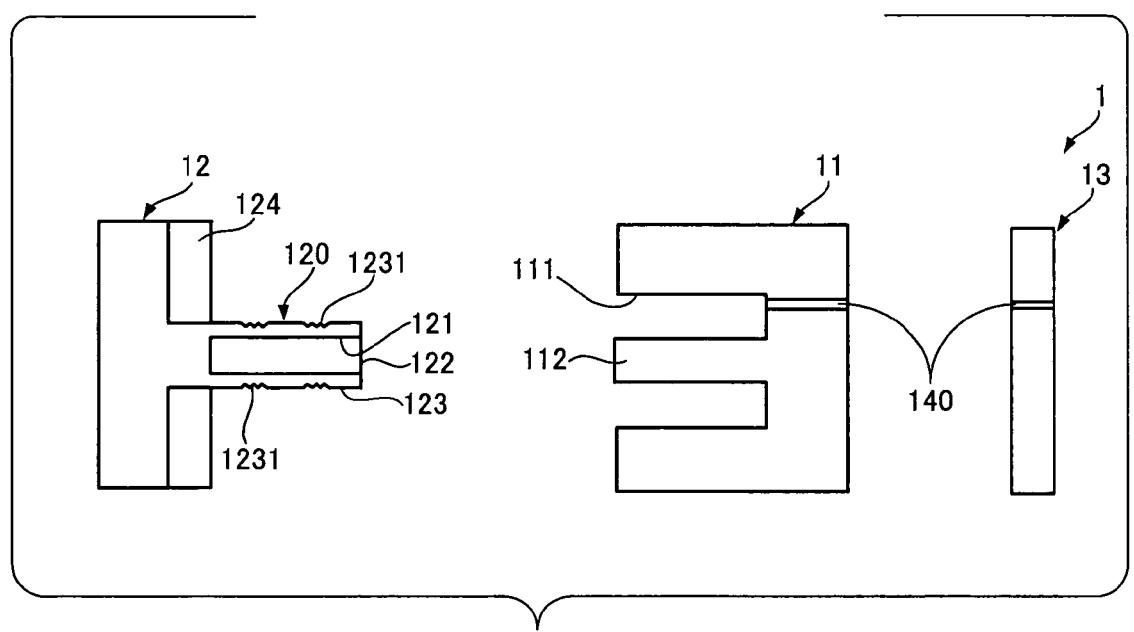
FIG. 4 illustrates a mold die according to a first embodiment of the present invention.

FIG. 4 illustrates a mold die 1 according to a first embodiment of the present invention.

The mold die 1 shown in FIG. 4 includes a stationary mold cavity 11, a movable mold cavity 12, and a stripper plate 13. The stationary mold cavity 11 has a peripheral wall 111 defining the external peripheral surface of the cylinder serving as a molded item and a core shaft 112 at the center thereof. The movable mold cavity 12 and the stripper plate 13 relatively advance to or retreat from the stationary mold cavity 11. FIG. 4 illustrates the opened mold die 1 according to the present embodiment, in addition to illustrating the movable mold cavity 12 and the stripper plate 13 both retreated from the stationary mold cavity 11.

The movable mold cavity 12 includes a sleeve section 120. The sleeve section 120 has a hollow 121 formed therein and an opening 122 formed at the end thereof, having the hollow 121 extending thereto. The sleeve section 120 has an external peripheral surface 123, which defines the internal peripheral surface of the cylindrical molded item. The sleeve section 120 of the movable mold cavity 12 of the opened mold die 1 shown in FIG. 4 has an external radius smaller than the designed value of the internal radius of the cylindrical molded item by the order of several micrometers to tens of micrometers. The external peripheral surface 123 of the sleeve section 120 has an undulation-section 1231 formed thereon for forming undercuts. The depth of the undulation-section 1231 is on the order of several micrometers to tens of micrometers. Also, the movable mold cavity 12 has an eject plate 124 disposed along the external peripheral surface 123 of the sleeve section 120 so as to advance or retreat in the axial direction of the sleeve section 120. The eject plate 124 shown in FIG. 4 lies at a retreated position.

The mold die 1 shown in FIG. 4 has a cavity defined by the stationary mold cavity 11, the external peripheral surface 123 of the sleeve section 120, and the eject plate 124 of the movable mold cavity 12. The stationary mold cavity 11 and the stripper plate 13 have a sprue-runner section 140 formed therein, for forming a sprue runner, serving as a path through which a molten resin is injected into the cavity.

Injection-molding performed by the mold die 1 shown in FIG. 4 will be described.

Figure 5:
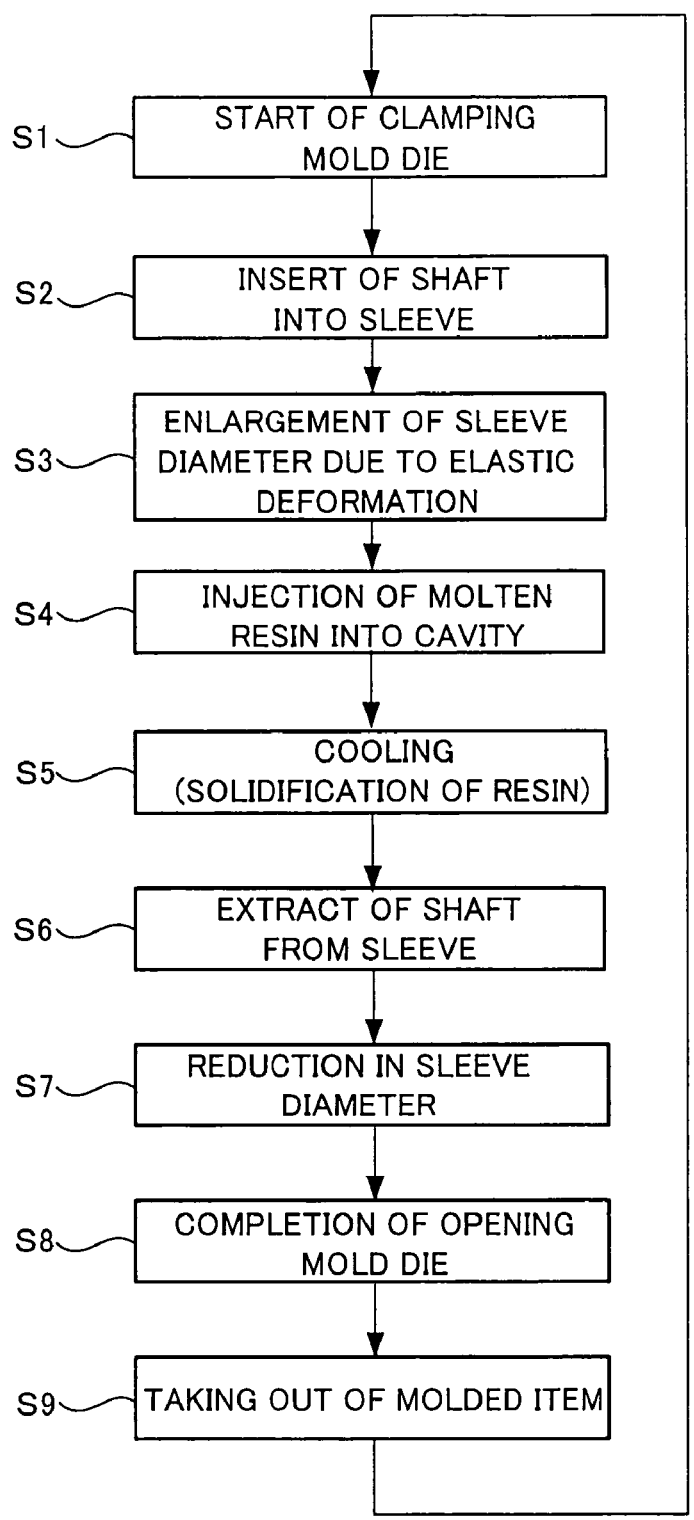
FIG. 5 is a flowchart of a process of injection-molding with the mold die shown in FIG. 4.

FIG. 5 illustrates a flowchart of an injection-molding process performed by the mold die 1 shown in FIG. 4.

In the first place, the opened mold die 1 shown in FIG. 4 starts to be clamped (in step S1). When the mold die 1 starts to be clamped, the movable mold cavity 12 and the stripper plate 13 retreated from the stationary mold cavity 11 both start to advance toward the stationary mold cavity 11, and the core shaft 112 of the stationary mold cavity 11 is inserted into the hollow 121 of the sleeve section 120 of the movable mold cavity 12 through the opening 122 of the same (in step S2). The core shaft 112 enters the hollow 121 of the sleeve section 120 and expands the sleeve section 120 outwards. That is, the external diameter of the sleeve section 120 is enlarged due to its elastic deformation (in step S3).

Figure 6:
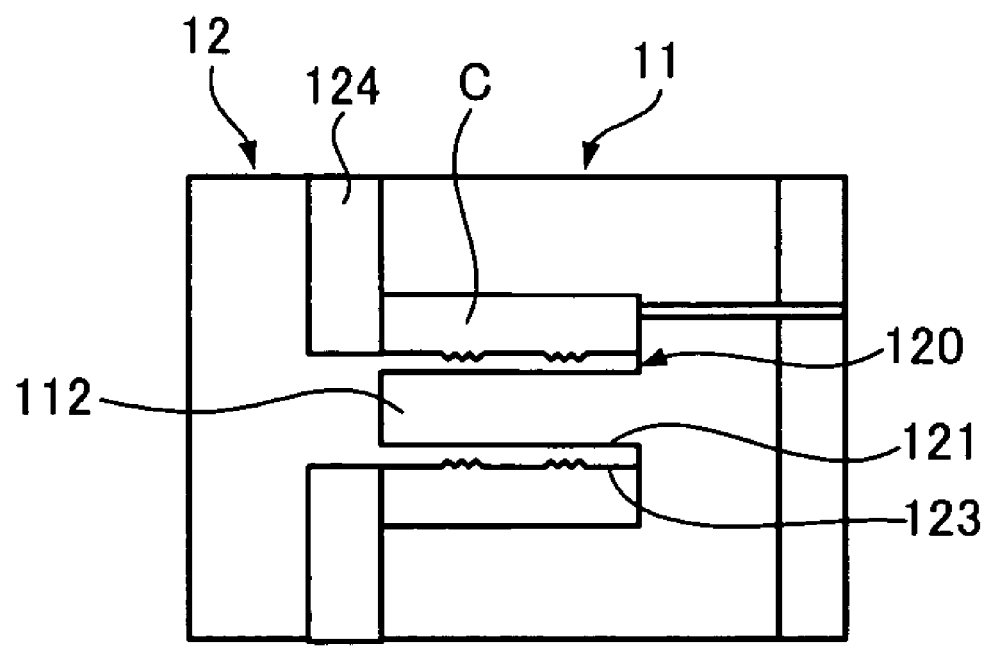
FIG. 6 illustrates a clamped state of the mold die shown in FIG. 4.

FIG. 6 illustrates a clamped state of the mold die 1 shown in FIG. 4.

FIG. 6 illustrates a cavity C defined by the stationary mold cavity 11, the external peripheral surface 123 of the sleeve section 120 and the eject plate 124 of the movable mold cavity 12, in addition illustrating the sleeve section 120 whose external diameter is enlarged by the order of several micrometers to tens of micrometers as a result of the core shaft 112 entering the hollow 121. The sleeve section 120 of the movable mold cavity 12 of the clamped mold die 1 shown in FIG. 6 has an external radius in agreement with the designed value of the internal radius of the cylindrical molded item.

As shown in the flowchart illustrated in FIG. 5, a molten resin such as PPS or LCP, a kind of super-engineering plastics, is subsequently injected into the cavity C of the clamped mold die 1 shown in FIG. 6 (in step S4). The molten resin is injected into the cavity C at a predetermined pressure of at least $1.0 \times 10^7$ Pa. The injection pressure is determined depending on the kind of a molten resin, and it is set to be suitable for accurately forming the molded item. Then, the molten resin injected in the cavity C is cooled and solidified (in step S5). After then, the mold die 1 starts to be opened. The stripper plate 13 and also the movable mold cavity 12 are retreated from the stationary mold cavity 11, and the core shaft 112 inserted in the hollow 121 of the sleeve section 120 of the movable mold cavity 12 through the opening 122 is then extracted from the hollow 121 (in step S6). The diameter of the sleeve section 120 of the movable mold cavity 12 is reduced due to its elasticity (in step S7). That is, the external radius of the sleeve section 120 is returned to the dimension smaller than the designed value of the internal radius of the cylinder serving as a molded item by the order of several micrometers to tens of micrometers. The undercuts of the molded item are thus drafted from the sleeve section 120. The molded item, whose undercuts are drafted from the sleeve section 120, are retreated together with the movable mold cavity 12 in a state of being supported by the sleeve section 120, and opening the mold die 1 is completed (in step S8). The sprue runner solidified in the sprue-runner section 140 is separated from the molded item in accordance with retreat of the stripper plate 13 and the movable mold cavity 12. In the last place, the molded item is drafted from the mold die 1 by advancing the eject plate 124 (in step S9).

Figure 7:
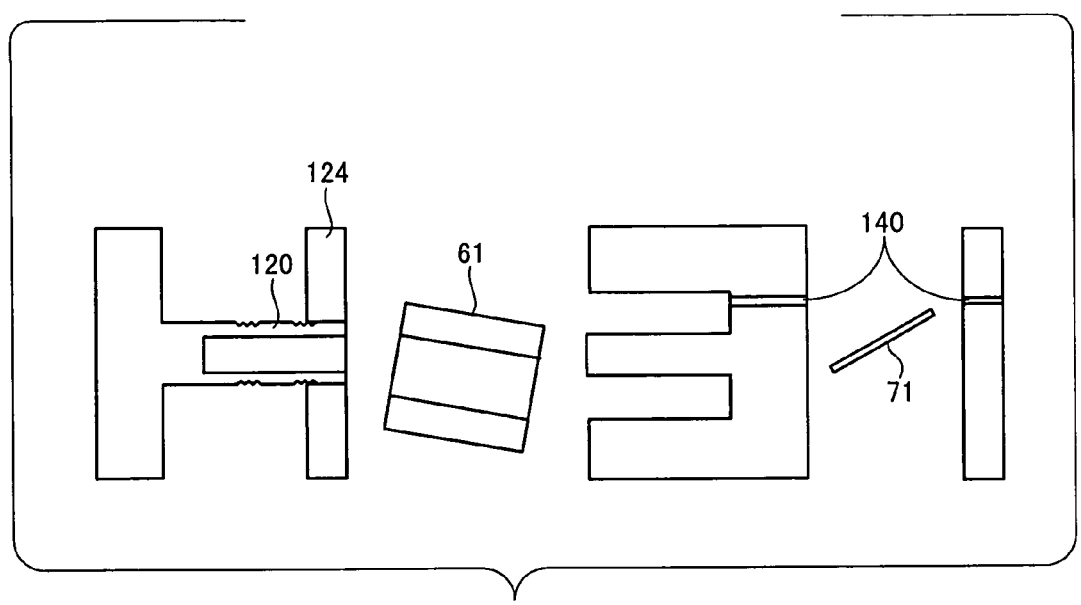
FIG. 7 illustrates a state of taking out a molded item from the mold die according to the present embodiment.

FIG. 7 illustrates a state of drafting a molded item 61 from the mold die 1 according to the present embodiment.

The molded item 61 supported by the sleeve section 120 is pushed out in accordance with advancement of the eject plate 124 and is eventually drafted from the sleeve section 120. FIG. 7 also illustrates a sprue runner 71 separated from the molded item 61.

A mold die 2 according to a second embodiment of the present invention will be now described. In the following description, difference between the mold die 2 from the mold die 1 shown in FIG. 4 and according to the first embodiment are mainly focused.

Figure 8:
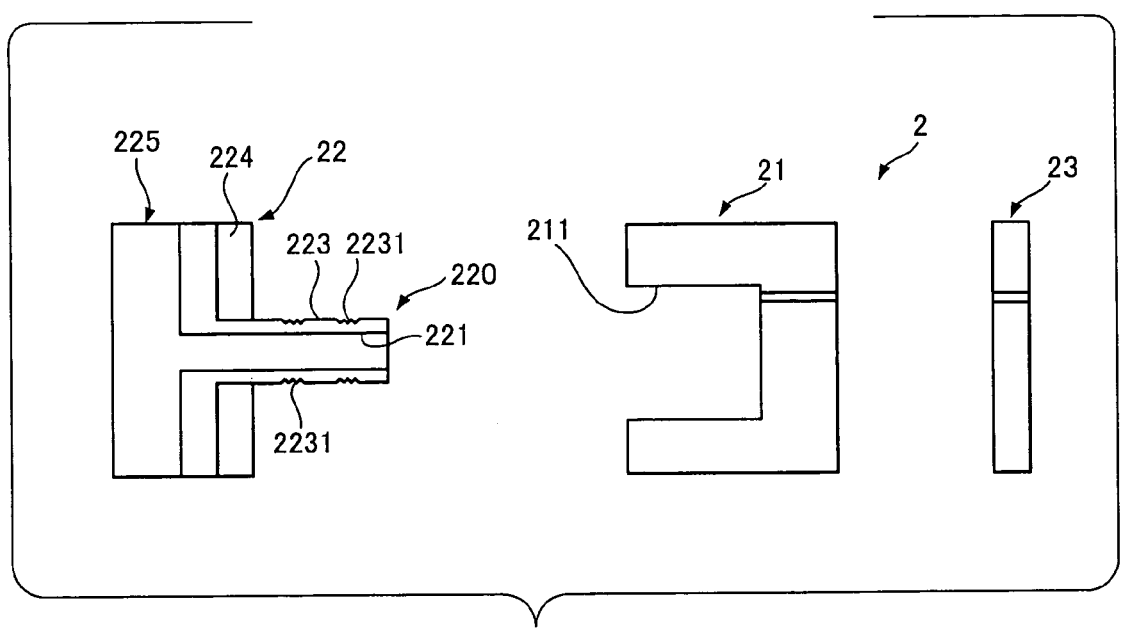
FIG. 8 illustrates a halfway state of opening a mold die according to a second embodiment of the present invention.

FIG. 8 illustrates a halfway state of opening the mold die 2 according to the second embodiment.

The mold die 2 shown in FIG. 8 includes a stationary mold cavity 21, a movable mold cavity 22, and a stripper plate 23 similar to the mold die 1 shown in FIG. 4. Although having an internal wall 211 defining the external peripheral surface of the cylinder serving as a molded item, the stationary mold cavity 21 shown in FIG. 8 has no core shaft 112 as shown in FIG. 4.

Being capable of relatively advancing to or retreating from the stationary mold cavity 21 similar to the movable mold cavity 12 shown in FIG. 4, the movable mold cavity 22 shown in FIG. 8 is divided into a sleeve section 220 and a core shaft section 225. The sleeve section 220 shown in FIG. 8 has a hollow 221 formed therein and openings formed at both ends thereof, having the hollow 221 extending thereto. The sleeve section 220 shown in FIG. 8 has an external peripheral surface 223 defining the internal peripheral surface of the cylinder serving as a molded item similar to the sleeve section 120 shown in FIG. 4, and the external peripheral surface 223 has an undulation-section 2231 formed thereon, for forming undercuts. The depth of the undulation-section 2231 is on the order of several micrometers to tens of micrometers. The movable mold cavity 22 has an eject plate 224 disposed thereon, advancing or retreating along the external peripheral surface 223 of the sleeve section 220 in the axial direction of the sleeve section 220. The eject plate 224 shown in FIG. 8 lies at a retreated position.

Figure 9:
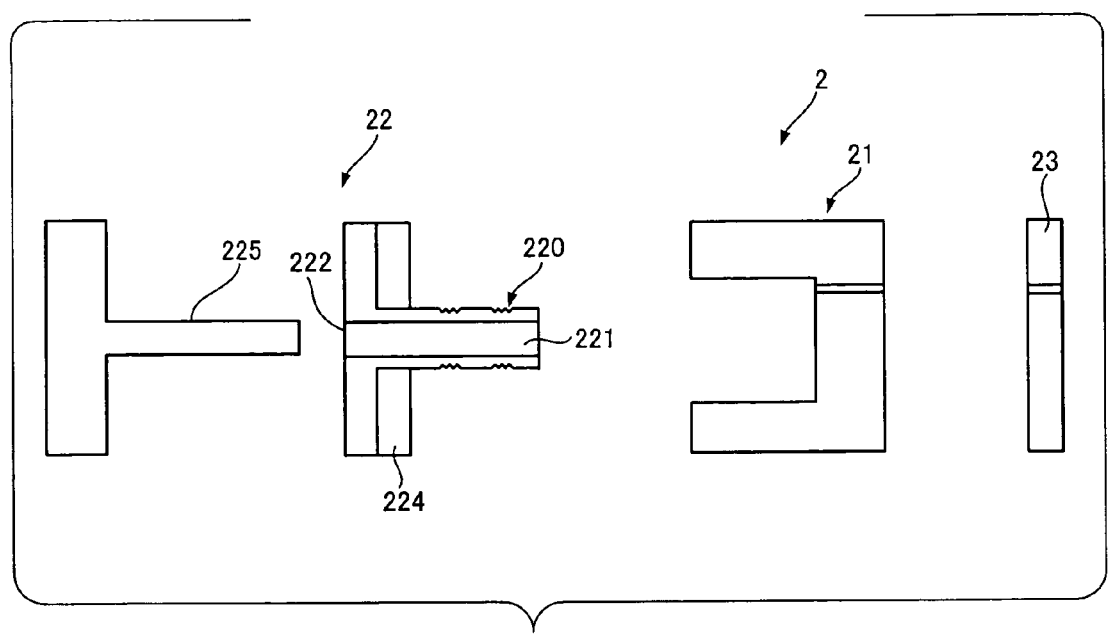
FIG. 9 illustrates a finished state of opening the mold die shown in FIG. 8.

Referring now to FIG. 9 in addition to FIG. 8, the mold die 2 according to the second embodiment will be further described.

FIG. 9 illustrates a completed state of opening the mold die 2 shown in FIG. 8.

The core shaft section 225 of the movable mold cavity 22 can relatively advance to or retreat from the hollow 221 of the sleeve section 220. The core shaft section 225 shown in FIG. 8 enters the hollow 221 through an opening 222 disposed in the sleeve section 220 lying opposite to the stationary mold cavity 21 and expands the sleeve section 220 outwards so as to enlarge the external diameter of the sleeve section 220.

On the occasion of opening the mold die 2 according to the present embodiment, the core shaft section 225 exits from the sleeve section 220 with retreating from the hollow 221 of the sleeve section 220. FIG. 9 illustrates a state in which the core shaft section 225 exits from the sleeve section 220 with retreating from the hollow 221. The external radius of the sleeve section 220 shown in FIG. 9 is smaller than the designed value of the internal radius of the cylinder serving as a molded item by the order of several micrometers to tens of micrometers.

In injection-molding performed by the mold die 2 shown in FIGS. 8 and 9, a similar process to that shown in the flowchart illustrated in FIG. 5 is carried out. The completely opened mold die 2 shown in FIG. 9 is clamped in the first place. On this occasion, the core shaft section 225 is advanced and inserted into the hollow 221 through the opening 222 disposed in the sleeve section 220 lying opposite to the stationary mold cavity 21 so as to enlarge the external diameter of the sleeve section 220. Then, the movable mold cavity 22 and the stripper plate 23 are advanced toward the stationary mold cavity 21 so as to complete clamping the mold die 2.

Figure 10:
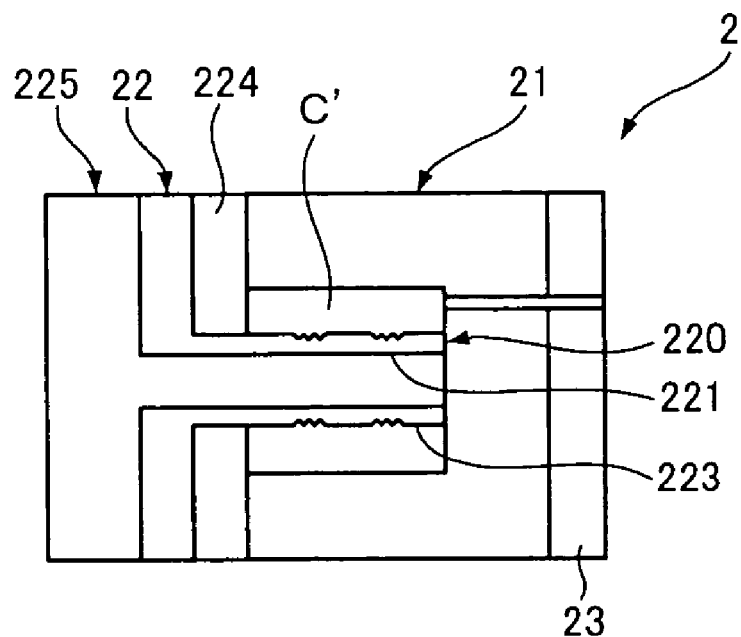
FIG. 10 illustrates a clamped state of the mold die shown in FIG. 9.

FIG. 10 illustrates a clamped state of the mold die 2 shown in FIG. 9.

FIG. 10 illustrates a cavity C' defined by the stationary mold cavity 21, the external peripheral surface 223 of the sleeve section 220 of the movable mold cavity 22, and the eject plate 224, in addition to illustrating the sleeve section 220 whose external radius is enlarged by the order of several micrometers to tens of micrometers in accordance with entrance of the core shaft section 225 into the hollow 221. The sleeve section 220 of the movable mold cavity 22 of the clamped mold die 2 shown in FIG. 10 has an external radius in agreement with the designed value of the internal radius of the cylinder serving as a molded item.

Subsequently, a molten resin such as PPS or LCP, a kind of super engineering plastics, is injected into the cavity C' of the clamped mold die 2 shown in FIG. 10 at a predetermined pressure of at least $1.0 \times 10^7$ Pa, and after cooling, the mold die 2 is opened. On the occasion of opening the mold die as shown in FIG. 8, the stripper plate 23 and the movable mold cavity 22 are retreated from the stationary mold cavity 21 in the first place. In this state, the undercuts of the molded item are not drafted from the sleeve section 220. Then, as shown in FIG. 9, the core shaft section 225 is retreated from the hollow 221 of the sleeve section 220 and drafted from the sleeve section 220. In this state, the diameter of the sleeve section 220 is reduced due to its own elasticity, and the undercuts of the molded item are drafted from the sleeve section 220. In the last place, the molded item is taken out by advancing the eject plate 224.

Figure 11:
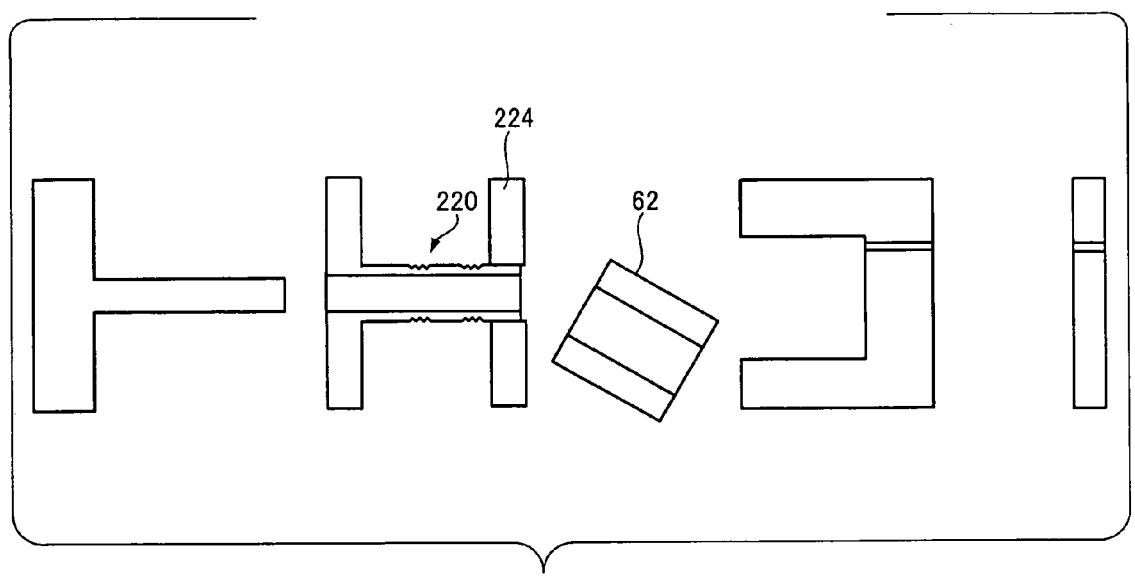
FIG. 11 illustrates a state of taking out a molded item from the mold die according to the present embodiment.

FIG. 11 illustrates a taking-out state of the molded item 62 from the mold die 2 according to the present embodiment.

The molded item 62, whose undercuts are drafted from the sleeve section 220, is supported by the sleeve section 220; pushed out in accordance with advancement of the eject plate 224; and eventually taken out from the sleeve section 220.

Referring to Table 2, materials applicable respectively to the sleeve section 120 and the core shaft 112 of the mold die 1 shown in FIG. 4, according to the first embodiment, as well as materials applicable respectively to the sleeve section 220 and the core shaft section 225 of the mold die 2 shown in FIG. 8, according to the second embodiment will be described.

TABLE 2

| | | Unit | Factors | | |
|---|---|---|---|---|---|
| Sleeve section 120, 220 | Material | — | Stainless steel | Maraging steel | Super-elastic alloy |
| | Longitudinal elastic modulus E | Pa | 2.0 × 10¹¹ | 1.86 × 10¹¹ | 7.0 × 10¹⁰ |
| | Allowable stress (proof stress) σ | Pa | 8.8 × 10⁸ | 1.5 × 10⁹ | 4.5 × 10⁸ |
| | Internal radius (shaft radius) r | mm | | 1.5 | |
| | Thickness t | mm | | 0.25 | |
| | Length | mm | | 10 | |
| | Circumferential stress Pc | Pa | 1.47 × 10⁸ | 2.5 × 10⁸ | 7.5 × 10⁷ |
| | Allowable strain ε(Δr/r) | — | 0.004 | 0.008 | 0.040 |
| | Change in radii (Δr) | μm | 7 | 12 | 60 |
| Core shaft 112 | Material | — | | high speed tool steel | |
| | Cross section | mm² | | 7.1 | |
| Core shaft section 225 | Contact area with sleeve | mm² | | 94.2 | |
| | Frictional coefficient with sleeve | — | | 0.3 | |
| | Inserting/extracting force | N | 4150 | 7070 | 2120 |
| | Axial stress | Pa | 5.87 × 10⁸ | 1.0 × 10⁹ | 3.0 × 10⁸ |

Materials applicable to the sleeve section 120 shown in FIG. 4 and the sleeve section 220 shown in FIG. 8 are metals each having a longitudinal elastic modulus greater than the value of an injection pressure. Table 2 lists a stainless steel, a maraging steel, and a super-elastic alloy respectively having longitudinal elastic moduli E of 2.0×10¹¹ Pa, 1.86×10¹¹ Pa, and 7.0×10¹⁰ Pa as example materials applicable to the sleeve section 120 shown in FIG. 4 and the sleeve section 220 shown in FIG. 8. Also, Table 2 shows allowable stresses (proof stresses) of these metals.

Table 2 also lists a high speed steel as an example material applicable to the core shaft 112 and the core shaft section 225 respectively shown in FIGS. 4 and 8.

Taking a combination of the sleeve section 120 and the core shaft 112 shown in FIG. 4 as an example, a stress which the sleeve section 120 receives upon insert of the core shaft 112 will be described.

Figure 12:
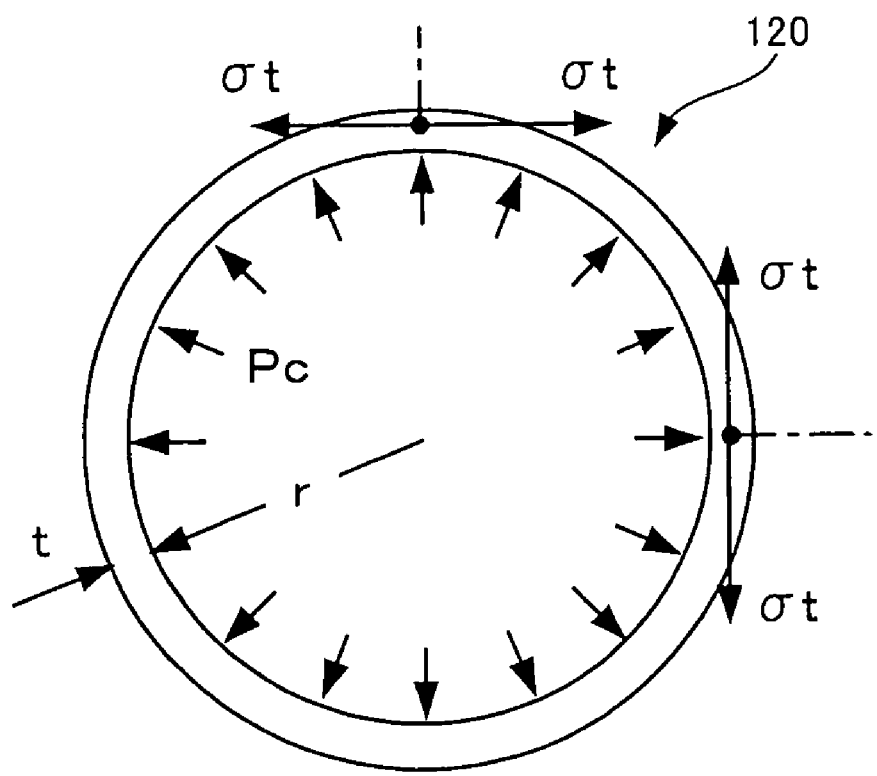
FIG. 12 illustrates a variety of parameters shown in Table 2.

FIG. 12 illustrates a variety of parameters listed in Table 2.

FIG. 12 illustrates the sleeve section 120 shown in FIG. 4, which has an external diameter of 3.5 mm and an internal diameter of 3.0 mm. Accordingly, the sleeve section 120 has an internal radius r of 1.5 mm and a wall thickness t of 0.25 mm. Meanwhile, the sleeve section 120 has a length of 10 mm.

When the core shaft 112 made from a high speed steel listed in Table 2 is inserted into the sleeve section 120 shown in FIG. 12, the sleeve section 120 receives a circumferential stress Pc. When a stress tangentially exerted on the sleeve section 120 is defined by $\sigma_t$, $\sigma_t$ is given by the expression: $\sigma_t = (Pc \times r)/t$. With the stress $\sigma_t$ obtained as described above, an allowable strain ε of the sleeve section 120 is given by the expression: $\varepsilon = \sigma_t/E$. When a change in the internal radii of the sleeve section 120 is defined by Δr, since the allowable strain ε is expressed by $\varepsilon = \Delta r/r$, the changes Δr in the internal radii r of the sleeve section 120 corresponding to the respective materials can be computed. The changes Δr in the internal radii of the sleeve section 120 calculated as described above are shown in Table 2. When a stainless steel, a maraging steel, or a super-elastic alloy is applied, the change Δr is 7 μm, 12 μm, or 60 μm, respectively. Hence, when the change Δr is greater than the depth of the undulation-section 1231 for forming undercuts, the diameter of the sleeve section 120 is reduced due to its own elasticity in accordance with extraction of the core shaft 112, whereby the undercuts of the molded item are drafted from the sleeve section 120. Since the depth of the undulation section 1231 is on the order of several micrometers to several tens micrometers as described above, it is understood that the undercuts can be drafted from the sleeve section 120 when one of the materials listed in Table 2 is applied to the sleeve section 120.

The inserting or extracting force of the core shaft 112 is obtained by multiplying the frictional coefficient between the core shaft 112 and the sleeve section 120 by the circumferential stress Pc of the sleeve section 120 and further by multiplying the contact area between the core shaft 112 and the sleeve section 120. The axial stress of the core shaft 112 is obtained by dividing its inserting or extracting force by its cross section.

Materials applicable to the sleeve section 120 and the sleeve section 220 respectively shown in FIGS. 4 and 8 are not limited to a stainless steel and a maraging steel, and a metal having a super-elastic property of a strain of 4% or more (for example, a shape-memory alloy having the maximum critical strain of about 8%) is also applicable. When a material having a super-elastic property of a critical strain of 4% is applied, dynamic-pressure grooves even having depths of about 60 μm can be drafted.

In the last place, the state of the internal peripheral surface of a dynamic-pressure bearing formed by injection-molding with the mold die according to the present invention, having herringbone dynamic-pressure grooves formed on the internal peripheral surface thereof will be described.

Figure 13:
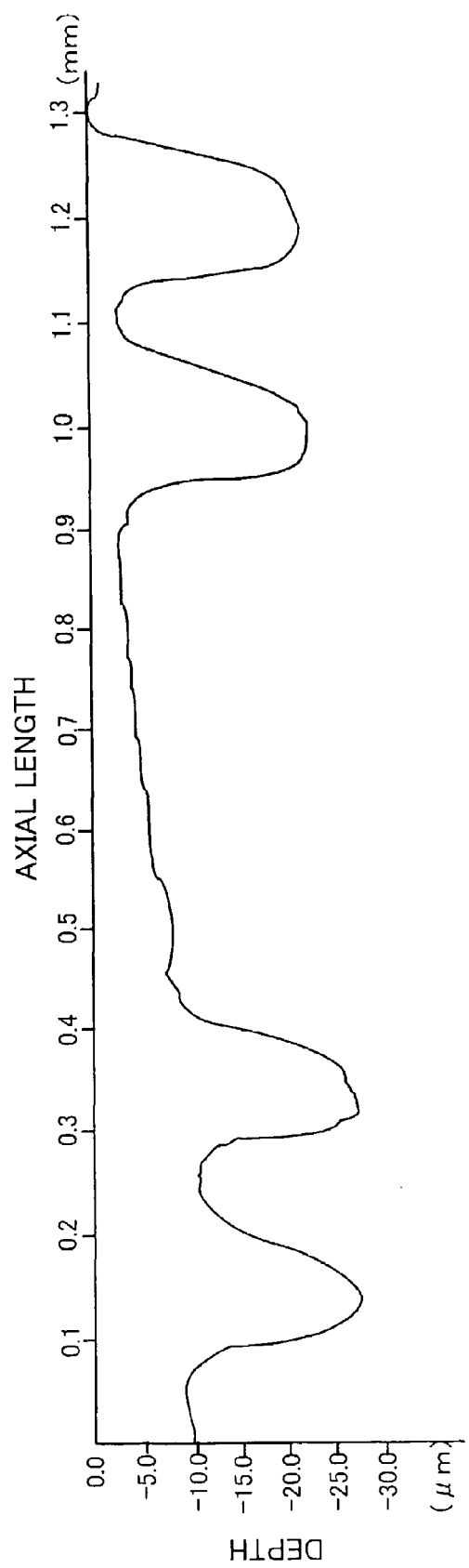
FIG. 13 is a graph illustrating an axial profile of herringbone grooves formed on the internal peripheral surface of the dynamic-pressure bearing shown in FIGS. 2 and 3 injection-molded with the mold die according to the present invention.

FIG. 13 is a graph illustrating a profile of the herringbone grooves formed on the internal peripheral surface of the dynamic-pressure bearing as shown in FIGS. 2 and 3, formed by injection-molding with the mold die according to the present invention.

The horizontal and vertical axes of the graph shown in FIG. 13 represent an axial length (mm) of the internal peripheral surface of the cylindrical dynamic-pressure bearing and a depth (μm) of an undulation formed on the internal peripheral surface, respectively.

FIG. 13 illustrates the measured result of the profile of the herringbone dynamic-pressure grooves of one of the two rows illustrated in FIG. 3. The flat portion at the central part of the graph corresponds to the reversed portion of the herringbone dynamic-pressure grooves. The respective depths of the herringbone dynamic-pressure grooves are about 15 μm, and the profile indicates that the herringbone dynamic-pressure grooves are accurately formed.

As described above, with the mold die according to the present invention, a resin-made dynamic-pressure bearing can be accurately molded in a simple process, and secondary processing such as deburring can be unnecessary because of injection-molding. The mold die according to the present invention is not limited to application to injection-molding of a dynamic-pressure bearing and it is also applicable to injection-molding of items such as a resin item, a sintered green body, and a metal-injection molded (MIM) item, having fine undulations formed on the internal surface thereof.

What is claimed is:

1. An injection-molding mold die for injecting a molten material at a predetermined pressure into a cavity formed by clamping the mold die, comprising:

a cylinder having (a) a continuous whole cylinder shape, (b) a hollow formed therein, (c) an opening formed at the end thereof, having the hollow extending thereto, and (d) an external peripheral surface defining a part of the cavity, and (e) an undercut-forming section forming a shape on the external peripheral surface, from which formed shape the mold die is unable to be separated in the mold die separation direction; and a diameter-enlarging member which enters the hollow through the opening so as to enlarge the external diameter of the cylinder and which can relatively advance to or retreat from the hollow, wherein the diameter-enlarging member lies in the hollow when the mold die is clamped and exits the hollow when the mold die is opened, and wherein the cylinder comprises a metal having a longitudinal elastic modulus greater than the value of the predetermined pressure, and the external diameter enlarged by the insertion of the diameter-enlarging member is reduced when the diameter-enlarging member exits the hollow.

2. The mold die according to claim 1, wherein the cylinder comprises a stainless steel.

3. The mold die according to claim 1, wherein the cylinder comprises a maraging steel.

* * * * *